United States Patent
Hamara et al.

(10) Patent No.: US 9,904,463 B2
(45) Date of Patent: Feb. 27, 2018

(54) METHOD AND APPARATUS FOR CONTROLLING USER CHARACTER FOR PLAYING GAME WITHIN VIRTUAL ENVIRONMENT

(71) Applicant: Sulake Corporation Oy, Helsinki (FI)

(72) Inventors: Antti Hamara, Helsinki (FI); Juho Iso-Markku, Helsinki (FI)

(73) Assignee: Sulake Corporation Oy, Helsinki (FI)

( * ) Notice: Subject to any disclaimer, the term of this patent is extended or adjusted under 35 U.S.C. 154(b) by 521 days.

(21) Appl. No.: 14/493,541

(22) Filed: Sep. 23, 2014

(65) Prior Publication Data
US 2016/0085437 A1    Mar. 24, 2016

(51) Int. Cl.
| | | |
|---|---|---|
| A63F 13/00 | (2014.01) | |
| G06F 3/0488 | (2013.01) | |
| G06F 3/01 | (2006.01) | |
| G06F 3/041 | (2006.01) | |
| G09G 5/02 | (2006.01) | |
| A63F 13/2145 | (2014.01) | |
| A63F 13/25 | (2014.01) | |
| A63F 13/285 | (2014.01) | |
| A63F 13/67 | (2014.01) | |
| A63F 13/42 | (2014.01) | |

(52) U.S. Cl.
CPC ...... *G06F 3/04883* (2013.01); *A63F 13/2145* (2014.09); *A63F 13/25* (2014.09); *A63F 13/285* (2014.09); *A63F 13/42* (2014.09); *A63F 13/67* (2014.09); *G06F 3/016* (2013.01); *G06F 3/017* (2013.01); *G06F 3/041* (2013.01); *G09G 5/02* (2013.01); *A63F 2300/1075* (2013.01)

(58) Field of Classification Search
CPC .... G06F 3/04886; G06F 3/017; A63F 13/214; A63F 13/2145; A63F 2300/1068; A63F 2300/1075
See application file for complete search history.

(56) References Cited

U.S. PATENT DOCUMENTS

| | | | | |
|---|---|---|---|---|
| 5,809,267 A | * | 9/1998 | Moran | G06F 3/04883 715/863 |
| 6,668,081 B1 | * | 12/2003 | Ilan | G06F 21/36 178/18.03 |
| 6,966,837 B1 | * | 11/2005 | Best | A63F 13/10 463/1 |

(Continued)

OTHER PUBLICATIONS

Extended European Search Report, Application No. 15186188.7-1905, dated May 17, 2016, 10 pages.

*Primary Examiner* — Steven J Hylinski
(74) *Attorney, Agent, or Firm* — Ziegler IP Law Group, LLC (57) ABSTRACT

A method for controlling a user character for playing a game within a virtual environment, including providing a user character and virtual environment information on the touch sensitive display to a user; detecting a touch gesture via a touch sensitive gesture input device, the touch gesture formed by a continuous sweep touching at least two touch sensitive elements arranged in the pre-defined array; comparing the detected touch gesture to reference gestures of the user character for playing the game within the virtual environment; and generating an action for the user character within the virtual environment in response to finding a matching reference gesture based on comparison.

15 Claims, 5 Drawing Sheets

(56) References Cited

U.S. PATENT DOCUMENTS

| | | | | |
|---|---|---|---|---|
| 7,004,394 B2* | 2/2006 | Kim | G06F 1/1616 | 235/439 |
| 7,098,896 B2* | 8/2006 | Kushler | G06F 3/04883 | 345/168 |
| 7,456,849 B2* | 11/2008 | Brooke | G06F 3/0481 | 345/661 |
| 7,535,460 B2* | 5/2009 | Momose | G06F 3/04883 | 345/173 |
| 8,062,115 B2* | 11/2011 | Thomas | G07F 17/32 | 463/16 |
| 8,282,484 B2* | 10/2012 | Toriyama | A63F 13/10 | 463/37 |
| 8,330,741 B1* | 12/2012 | Camarota | G06F 3/0416 | 345/174 |
| 8,558,792 B2* | 10/2013 | Momose | A63F 13/10 | 345/162 |
| 8,777,746 B2* | 7/2014 | Watkins, Jr. | G06F 3/04883 | 463/37 |
| 8,836,648 B2* | 9/2014 | Wilairat | G06F 3/04883 | 178/18.01 |
| 9,310,994 B2* | 4/2016 | Hinckley | G06F 3/0483 | |
| 2005/0159223 A1* | 7/2005 | Tahara | A63F 13/10 | 463/43 |
| 2005/0190973 A1* | 9/2005 | Kristensson | G06K 9/222 | 382/229 |
| 2006/0010400 A1* | 1/2006 | Dehlin | G06F 3/0354 | 715/856 |
| 2006/0030384 A1* | 2/2006 | Yoshizawa | G07F 17/3209 | 463/7 |
| 2006/0038813 A1* | 2/2006 | Dohta | G06T 11/203 | 345/419 |
| 2006/0160591 A1* | 7/2006 | Kogo | A63F 13/12 | 463/1 |
| 2006/0227139 A1* | 10/2006 | Momose | A63F 13/10 | 345/441 |
| 2007/0261116 A1* | 11/2007 | Prafullchandra | H04L 63/102 | 726/22 |
| 2009/0138800 A1* | 5/2009 | Anderson | G06F 3/04883 | 715/702 |
| 2009/0213081 A1* | 8/2009 | Case, Jr. | G06F 1/1616 | 345/173 |
| 2010/0156656 A1* | 6/2010 | Duarte | G06F 3/04886 | 340/815.4 |
| 2011/0141052 A1* | 6/2011 | Bernstein | G06F 3/016 | 345/174 |
| 2011/0179388 A1* | 7/2011 | Fleizach | G06F 3/04886 | 715/840 |
| 2011/0191675 A1* | 8/2011 | Kauranen | G06F 3/04847 | 715/702 |
| 2011/0209093 A1* | 8/2011 | Hinckley | G06F 3/04817 | 715/834 |
| 2011/0273380 A1* | 11/2011 | Martin | G06F 3/04883 | 345/173 |
| 2012/0034978 A1* | 2/2012 | Lim | A63F 13/235 | 463/36 |
| 2012/0124472 A1* | 5/2012 | Pine | G06F 3/038 | 715/707 |
| 2012/0223890 A1* | 9/2012 | Borovsky | G06F 3/04883 | 345/173 |
| 2013/0012319 A1* | 1/2013 | Negroponte | A63F 13/2145 | 463/37 |
| 2013/0031515 A1* | 1/2013 | Funabashi | G06F 3/04886 | 715/863 |
| 2013/0079140 A1 | 3/2013 | Watkins, Jr. et al. | | |
| 2013/0084980 A1* | 4/2013 | Hammontree | A63F 13/06 | 463/36 |
| 2013/0150165 A1* | 6/2013 | Takahashi | G06F 3/041 | 463/37 |
| 2013/0249806 A1* | 9/2013 | Crisan | G06F 3/04883 | 345/173 |
| 2014/0139450 A1* | 5/2014 | Levesque | G08B 6/00 | 345/173 |
| 2014/0198065 A1* | 7/2014 | Otsu | G06F 3/0488 | 345/173 |
| 2014/0213354 A1* | 7/2014 | Chen | A63F 13/06 | 463/31 |
| 2014/0237392 A1* | 8/2014 | Hoomani | H04L 51/32 | 715/757 |
| 2014/0310661 A1* | 10/2014 | Frederickson | G06F 3/04883 | 715/863 |
| 2015/0057059 A1* | 2/2015 | Ilchyshyn | A63F 9/0613 | 463/9 |
| 2015/0157932 A1* | 6/2015 | Kwon | G06Q 50/00 | 463/31 |
| 2015/0177904 A1* | 6/2015 | Makuch | A63F 13/426 | 345/178 |
| 2015/0182856 A1* | 7/2015 | Mays | A63F 13/2145 | 463/31 |
| 2015/0231500 A1* | 8/2015 | Aizono | A63F 13/537 | 463/31 |
| 2015/0238861 A1* | 8/2015 | Inamori | A63F 13/537 | 463/31 |
| 2015/0251087 A1* | 9/2015 | Nishino | A63F 13/2145 | 463/31 |
| 2015/0258441 A1* | 9/2015 | Borodovsky | A63F 13/537 | 463/31 |
| 2016/0202760 A1* | 7/2016 | Churikov | G06F 3/016 | 345/173 |

* cited by examiner

METHOD AND APPARATUS FOR CONTROLLING USER CHARACTER FOR PLAYING GAME WITHIN VIRTUAL ENVIRONMENT

TECHNICAL FIELD

The present application generally relates to a method and an apparatus for controlling a user character for playing a game within a virtual environment. The present application further relates to a method and an apparatus for detecting a user touch gesture, controlling the user character based on the detected touch gesture and providing feedback to the user.

BACKGROUND ART

Virtual environments and games relating to virtual environments are well known. For example, hundreds of thousands of players access massive multi player online games and online auctions. Often, though not necessarily, virtual environment games require a dedicated and comprehensive user interface to control maneuvers of a user character within the virtual environment.

It would be advantageous to provide improved methods and apparatus for increasing the user character maneuver control with reduced user interface complexity.

SUMMARY

According to a first example aspect of the present disclosure there is provided an apparatus for controlling a user character for playing a game within a virtual environment, comprising:

a touch sensitive display for displaying a user character and virtual environment information to a user;

a touch sensitive gesture input device comprising a plurality of touch sensitive elements arranged in a pre-defined array;

at least one processor; and at least one memory including computer program code, the at least one memory and the computer program code being configured to, with the at least one processor, cause the apparatus at least to:

provide the user character and the virtual environment information via the touch sensitive display;

detect a touch gesture via the touch sensitive gesture input device, the touch gesture formed by a continuous sweep touching at least two touch sensitive elements arranged in the pre-defined array;

compare the detected touch gesture to reference gestures of the user character for playing the game within the virtual environment; and generate an action for the user character within the virtual environment in response to finding a matching reference gesture based on comparison.

In an embodiment, the touch sensitive gesture input device is integrated to the touch sensitive display, wherein the touch sensitive gesture input device is arranged on an edge area of the touch sensitive display, and the user character and the virtual environment information are arranged on a central area of the touch sensitive display, wherein the edge area is non-overlapping the central area.

In an embodiment, the touch sensitive gesture input device is discrete from the touch sensitive display.

In an embodiment, the plurality of touch sensitive elements arranged in a pre-defined array comprise at least two rows of touch sensitive elements and at least two columns of touch sensitive elements.

In an embodiment, the at least one memory and the computer program code being further configured to, with the at least one processor, cause the apparatus at least to:

maintain reference gestures as multipart reference gestures, wherein at least one multipart reference gesture comprising a first reference part defined by a continuous sweep from a first touch sensitive element to a second touch sensitive element, and a second reference part defined by a continuous sweep from the second touch sensitive element to a third touch sensitive element.

In an embodiment, the at least one memory and the computer program code being further configured to, with the at least one processor, cause the apparatus at least to:

detect the touch gesture as a multipart gesture, the multipart gesture comprising a first part defined by a continuous sweep from a first touch sensitive element to a second touch sensitive element, and a second part defined by a continuous sweep from the second touch sensitive element to a third touch sensitive element.

In an embodiment, the at least one memory and the computer program code being further configured to, with the at least one processor, cause the apparatus at least to:

compare the detected first part of the multipart gesture to first reference parts of the multipart reference gestures; and generate first feedback information to the user in response to finding a matching first reference part based on comparison.

In an embodiment, the at least one memory and the computer program code being further configured to, with the at least one processor, cause the apparatus at least to:

compare the detected first part of the multipart gesture to first reference parts of the multipart reference gestures; and generate second feedback information to the user in response to not finding a matching first reference part based on comparison.

According to a second example aspect of the present disclosure there is provided a method for controlling a user character for playing a game within a virtual environment, comprising:

providing a user character and virtual environment information via the touch sensitive display to a user;

detecting a touch gesture via a touch sensitive gesture input device, the touch sensitive gesture input device comprising a plurality of touch sensitive elements arranged in a pre-defined array, the touch gesture formed by a continuous sweep touching at least two touch sensitive elements arranged in the pre-defined array;

comparing the detected touch gesture to reference gestures of the user character for playing the game within the virtual environment; and generating an action for the user character within the virtual environment in response to finding a matching reference gesture based on comparison.

In an embodiment, the method further comprises:

maintaining reference gestures, wherein at least one reference gesture comprising a first reference part defined by a continuous sweep from a first touch sensitive element to a second touch sensitive element.

In an embodiment, the method further comprises:

detecting the touch gesture, the touch gesture comprising a first part defined by a continuous sweep from a first touch sensitive element to a second touch sensitive element.

In an embodiment, the method further comprises:

comparing the detected first part of the gesture to first reference parts of the reference gestures; and generating first feedback information to the user in response to finding a matching first reference part based on comparison.

In an embodiment, the method further comprises: generating first feedback information to the user by changing color information of at least one touch sensitive element.

In an embodiment, the method further comprises:

comparing the detected first part of the gesture to first reference parts of the multipart reference gestures; and generating second feedback information to the user in response to not finding a matching first reference part based on comparison.

In an embodiment, the method further comprises:

generating second feedback information to the user by changing color information of at least one touch sensitive element.

In an embodiment, first feedback information is different to second feedback information.

In an embodiment, the first feedback information to the user comprising at least one of the following:

changed color information of at least one touch sensitive element;

changed color information of a line provided for connecting at least two touch sensitive elements;

sound information; and tactile feedback information.

In an embodiment, the second feedback information to the user comprising at least one of the following:

changed color information of at least one touch sensitive element;

changed color information of a line provided for connecting at least two touch sensitive elements;

sound information; and tactile feedback information.

In an embodiment, the changed color information relating to the first feedback information is different to the changed color information relating to the second feedback information.

In an embodiment, the method further comprises:

receiving reference gesture information from a user, the reference gesture information comprising a reference gesture of the user character for playing the game within the virtual environment, and an action for the user character within the virtual environment corresponding to the reference gesture information; and approving the received reference gesture information by an administrator of the virtual environment; and maintaining the received reference gesture and corresponding action to be used by at least one user for playing the game within the virtual environment in response to approving.

According to a third example aspect of the present disclosure there is provided a computer program embodied on a computer readable non-transitory medium comprising computer executable program code, which code, when executed by at least one processor of an apparatus, causes the apparatus to:

provide a user character and virtual environment information a the touch sensitive display to a user;

detect a touch gesture via a touch sensitive gesture input device, the touch sensitive gesture input device comprising a plurality of touch sensitive elements arranged in a pre-defined array, the touch gesture formed by a continuous sweep touching at least two touch sensitive elements arranged in the pre-defined array;

compare the detected touch gesture to reference gestures of the character for playing the game within the virtual environment; and generate an action for the user character within the virtual environment in response to finding a matching reference gesture based on comparison.

Different non-binding example aspects and embodiments of the present present disclosure have been illustrated in the foregoing. The above embodiments are used merely to explain selected aspects or steps that may be utilized in implementations of the present present disclosure. Some embodiments may be presented only with reference to certain example aspects of the present disclosure. It should be appreciated that corresponding embodiments may apply to other example aspects as well.

BRIEF DESCRIPTION OF THE DRAWINGS

The present disclosure will be described, by way of example only, with reference to the accompanying drawings, in which.

DETAILED DESCRIPTION

In the following description, like numbers denote like elements.

in an embodiment, virtual environment service may comprise a service that is connected using either a network of a service central server and at least two service apparatuses or a peer-to-peer network of at least two service apparatuses. Users may create characters that may interact with each other in a virtual environment provided by the service that is stored on the service central server and the service apparatuses. The virtual environment service may comprise a multi-player game, for example.

In an embodiment, a user may register an account with a service central server or within a peer-to-peer network and create characters that can interact with other characters in a virtual service environment. The player account may mean an account on the service central server or within a peer-to-peer network that contains a player profile including personal, billing, and character account information, such as user level in the virtual service environment.

In an embodiment, the virtual environment service may comprise at least one of the following: a virtual game, a social network application, an online auction service and a virtual community service.

In an embodiment, a character within the virtual environment may carry out different actions. The actions may comprise different moves made by the character or different activities made by the character, for example.

In an embodiment, gestures are defined to input user intent. Via using the gestures, user interface of the user apparatus may be designed so that for touch-sensitive devices that unlike game controllers have no dedicated buttons to play a game or operate the virtual environment service, an improved user experience can still be achieved.

The game or the virtual environment service may provide context-sensitive controls assuming correspondence between actions and targeted objects. One action may be performed for a given object, or to perform multiple actions, these actions may be performed in sequence.

Thus, a richer gaming experience and increased player engagement may be provided while making the playing within the virtual environment more involved. The systems and methods described here enable a player to have a unique and more enjoyable gaming experience.

A character for playing a game within a virtual environment is controlled by a user of an apparatus. The apparatus comprises, for example, a touch sensitive display for displaying the character and virtual environment information to the user, and a touch sensitive gesture input device comprising a plurality of touch sensitive elements arranged in a pre-defined array. The apparatus further comprises at least one processor; and at least one memory including computer program code, and the apparatus is configured to provide the character and the virtual environment information via the touch sensitive display to the user. Apparatus is further configured to detect a touch gesture by the user via the touch sensitive gesture input device, the touch gesture formed by a continuous sweep touching at least two touch sensitive elements arranged in the pre-defined array, compare the detected touch gesture to reference gestures of the character for playing the game within the virtual environment; and generate an action for the character within the virtual environment in response to finding a matching reference gesture based on comparison.

In an embodiment, a plurality of actions is defined for a character within the virtual environment. For each active action a reference gesture is defined. Thus, when the user inputs a gesture via a touch sensitive gesture input device, the gesture is detected and then compared to the reference gestures. If a match is found when comparing, a corresponding action is generated for the character within the virtual environment, for example within the game.

To detect the touch gesture via the touch sensitive gesture input device, the touch gesture is formed by a continuous sweep touching at least two touch sensitive elements arranged in the pre-defined array. The touch sensitive elements are distinct elements provided to the user. The pre-defined array may comprise a plurality of rows and a plurality of columns, and the overall shape of the array may vary. In an example, the array may be shaped so that a simplified version of the user character could be drawn on the array. Such solution would enable the user to emulate the gestures to correspond the action desired, such as raising both hands, for example.

In an embodiment, not only the action may be detected by the sweep gesture using the pre-defined array of the input device. Additionally, the speed of the sweep gesture may be detected and the character action speed controlled correspondingly.

In an embodiment, character related game data is maintained. Such character related game data may comprise status information of the user character within the virtual environment, such as character experience information, user level information or character mood information, for example. Then, an action is generated for the character within the virtual environment based on the detected gesture and the character related game data. Thus, same gesture may trigger different variations of actions for the user character depending on the user character status information, such as mood, for example.

The touch sensitive gesture input device may be integrated to the touch sensitive display or provided as a discrete device from the touch sensitive display.

In an embodiment, reference gestures are maintained as multipart reference gestures, wherein at least one multipart reference gesture comprising a first reference part defined by a continuous sweep from a first touch sensitive element to a second touch sensitive element, and a second reference part defined by a continuous sweep from the second touch sensitive element to a third touch sensitive element. The user touch gesture may be detected as a multipart gesture, the multipart gesture comprising a first part defined by a continuous sweep from a first touch sensitive element to a second touch sensitive element, and a second part defined by a continuous sweep from the second touch sensitive element to a third touch sensitive element.

In an embodiment, a first reference part defined by a continuous sweep from a first touch sensitive element to a second touch sensitive element, and a second reference part defined by a continuous sweep from the second touch sensitive element to a third touch sensitive element, wherein the first reference part and the second reference part define a continuous sweep comprising the first and the second reference part.

In an embodiment, a first part defined by a continuous sweep from a first touch sensitive element to a second touch sensitive element, and a second part defined by a continuous sweep from the second touch sensitive element to a third touch sensitive element, wherein the first part and the second part define a continuous sweep comprising the first and the second reference part.

In an embodiment, a first part is defined by a continuous sweep from a first touch sensitive element to a second touch sensitive element and a second part is defined by a continuous sweep from the second touch sensitive element to a third touch sensitive element, wherein the first part and the second part define a discontinuous sweep comprising the first and the second part.

The detected first part of the multipart gesture may then be compared to first reference parts of the multipart reference gestures; and first feedback information (such as changing color information, to such as green, of touch sensitive elements involved for the detected first part of the multipart gesture) generated to the user in response to finding a matching first reference part based on comparison.

In an embodiment, second feedback information may be generated to the user in response to not finding a matching first reference part based on comparison. The second feedback may be, for example, changing colors of the touch sensitive elements involved in the continuous sweep to a certain color, for example red. Correspondingly, when detecting the first part of the sweep gesture to have a match in the reference multipart gestures, a different color may be used for the touch sensitive elements, for example green.

When using different colors for the multipart gestures, the user may be informed if the sweep gesture in process so far, is possible or not. If the user has input a first part of the multipart gesture such that there is no reference gesture available, the user may be informed right away by coloring all touch sensitive elements, or at least the elements used for the previous sweep gesture part, with a different color.

The gesture in the reference gesture table may depend on the game context and the user level within the game or the virtual environment service. The game context may further include any static or dynamic objects or other user characters in the character's path. The game context may further include the position and trajectory of any dynamic objects or non-player characters in the character's path at the moment when the player gesture is initiated.

In an embodiment, the game is a platform game and the reference gestures may change within different platforms. This way more complex user character actions may be provided and the virtual environment of the game may be enhanced and developed more easily.

In an embodiment, a touch gesture input may include interaction with a virtual object, such as another user character. It may also be inferred from the game context that a player's character desires to interact with a virtual object (e.g. send a kiss), even if the gesture would otherwise be interpreted strictly as a movement gesture (e.g. waving a hand or jumping).

The reference gesture table may be maintained in persistent memory at a server. Alternatively, the reference gesture table may be stored on the mobile apparatus the user is using for playing the game, for example.

In an embodiment, an action for the character within the virtual environment may comprise at least one of the following:
  waving a hand;
  sending a flying kiss;
  crying;
  jumping;
  shaking hands;
  opening a door; and
  grasping an object.

In an embodiment, user progress, positive actions and behavior towards the community may unlock them new actions to be performed by the user character.

In an embodiment, a user may define new actions to be performed by the user character, and reference gestures corresponding the defined actions.

Reference gesture information may be received from a user operating a user apparatus and a client application, for example. The reference gesture information may comprise a reference gesture of the user character for playing the game within the virtual environment, and an action for the user character within the virtual environment corresponding to the reference gesture information. The reference gesture information may then be transmitted to a server apparatus for approving. An administrator of the virtual environment service, e.g. a game, may review the reference gesture information for approval. The administrator may check that no overlapping gesture/action exist and that the action is appropriate for the service. After approving the received reference gesture information by the administrator of the virtual environment, the received reference gesture and corresponding action is maintained in the server system to be used by at least one user for playing the game within the virtual environment.

In an embodiment, an example case for a user may be as follows. First a user logs in to the virtual environment service (for example a game) using the user account with a certain user level. The user level may comprise a set of character actions maintained by the system and mapped with corresponding reference gestures. As the user desires to carry out an action within the virtual environment, he/she may perform a touch gesture via a touch sensitive gesture input device, the touch gesture formed by a continuous sweep touching at least two touch sensitive elements arranged in a pre-defined array. In an embodiment, the detected touch gesture is compared to reference gestures of the character for playing the game within the virtual environment, and an action for the character is generated within the virtual environment in response to finding a matching reference gesture based on comparison.

Figure 1:
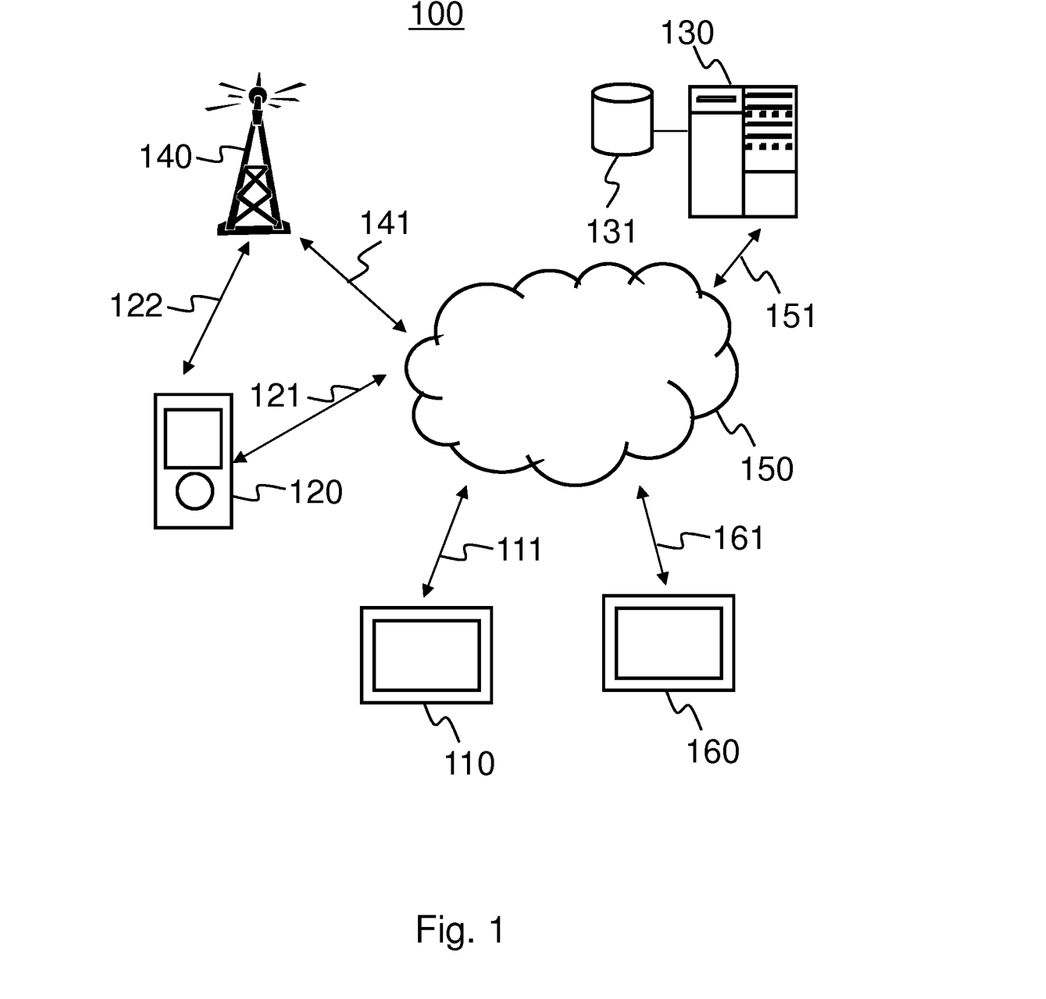
FIG. 1 shows a schematic picture of a system according to an example embodiment of the present disclosure.

FIG. 1 shows a schematic picture of a system 100 according to an example embodiment of the present disclosure.

A user apparatus 110, 120, 160 may comprise a mobile phone, an internet tablet, a mobile terminal or a laptop computer, for example. The user apparatus 110, 120, 160 is capable of downloading and locally executing software program code. The software program code may be a client application of a service whose server application is running on the server apparatus 130 of the system 100. The user apparatus 120 is configured to be connectable to a wireless communication network 140 over a wireless connection 122. The wireless connection 122 may comprise a mobile cellular network or a wireless local area network (WLAN), for example. The wireless communication network may be to a public data communication network 150, for example the Internet, over a data connection 141. The user apparatus 120 may be connected to the public data communication network 150 over a data connection 121 that may comprise a local area network (LAN) or a wireless area network (WLAN), for example.

In an embodiment, the system 100 comprises the user apparatus such as a computer apparatus 110, 160 configured to be connected to a public data communication network 150, for example the Internet, over a data connection 111, 161.

In an embodiment, the system 100 comprises a server apparatus 130, which comprises a storage device 131 for storing virtual environment service data and user data. Such data may be transferred over a data connection 151.

In an embodiment, a proprietary application in the user apparatus 110, 120, 160 may be a client application of a service, for example a game involving a character controlled by a user within a virtual environment, whose server application is running on the server apparatus 130 of the system 100. The proprietary application may capture user activity and feedback, as well as provide user interface data for the service.

Figure 2:
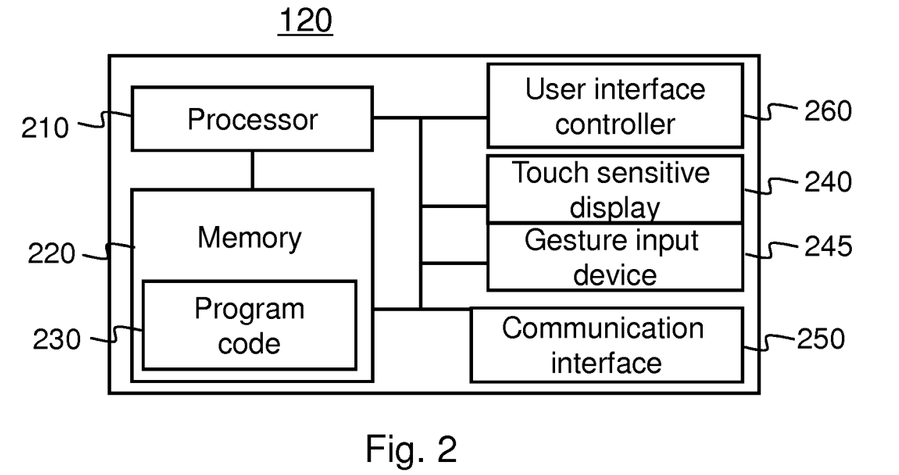
FIG. 2 presents an example block diagram of a user apparatus in which various embodiments of the present disclosure may be applied.

FIG. 2 presents an example block diagram of a user apparatus 120 in which various embodiments of the present disclosure may be applied. The user apparatus 120 may be a user equipment (UE), user device or apparatus, such as a mobile terminal, a smart phone or other communication device.

The general structure of the user apparatus 120 comprises a user interface, such as a touch sensitive display 240, a touch sensitive gesture input device 245, a communication interface 250, a processor 210, and a memory 220 coupled to the processor 210. The user apparatus 120 further comprises software 230 stored in the memory 220 and operable to be loaded into and executed in the processor 210. The software 230 may comprise one or more software modules and can be in the form of a computer program product. The user apparatus 120 may further comprise a user interface controller 260.

The processor 210 may be, e.g., a central processing unit (CPU), a microprocessor, a digital signal processor (DSP), a graphics processing unit, or the like. FIG. 2 shows one processor 210, but the user apparatus 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The user apparatus 120 may comprise a plurality of memories. The memory 220 may be constructed as a part of the user apparatus 120 or it may be inserted into a slot, port, or the like of the user apparatus 120 by a user. The memory 220 may serve the sole purpose of storing data, or it may be constructed as a part of an apparatus serving other purposes, such as processing data. A proprietary virtual environment service application and service data may be stored to the memory 220.

The user interface controller 260 may comprise circuitry for receiving input from a user of the user apparatus 120, e.g., via a keyboard, graphical user interface shown on the display of the user interfaces 240 of the user apparatus 120, speech recognition circuitry, or an accessory device, such as a headset, and for providing output to the user via, e.g., a graphical user interface or a loudspeaker. The touch sensitive gesture input device 245 may be integrated to the touch sensitive display 240 or provided as a separate device.

The communication interface module 250 implements at least part of data transmission. The communication interface module 250 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB) for example. The communication interface module 250 may be integrated into the user apparatus 120, or into an adapter, card or the like that may be inserted into a suitable slot or port of the user apparatus 120. The communication interface module 250 may support one radio interface technology or a plurality of technologies. The user apparatus 120 may comprise a plurality of communication interface modules 250.

A skilled person appreciates that in addition to the elements shown in FIG. 2, the user apparatus 120 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the user apparatus 120 may comprise a disposable or rechargeable battery (not shown) for powering when external power if external power supply is not available.

In an embodiment, the user apparatus 120 comprises speech recognition means. Using these means, a pre-defined phrase may be recognized from the speech and translated into control information for the apparatus 120, for example.

FIGS. 3a-d present example schematic figures of a user interface of an apparatus for controlling a character for playing a game within a virtual environment in which various embodiments of the present disclosure may be applied.

Figure 3A:
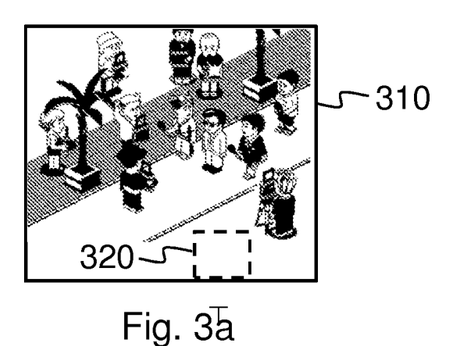
FIGS. 3a-d present example schematic figures of a user interface of an apparatus for controlling a character for playing a game within a virtual environment in which various embodiments of the present disclosure may be applied.

FIG. 3a presents an example schematic figure of a user interface of an apparatus for controlling a character for playing a game within a virtual environment. A touch sensitive display 310 is provided for displaying a character and virtual environment information to a user as illustrated in FIG. 3a. A touch sensitive gesture input device 320 is provided to receive user provided gesture input.

In an embodiment, a touch sensitive gesture input device 320 is integrated to the touch sensitive display 310, wherein the touch sensitive gesture input device 320 is arranged on an edge area of the touch sensitive display 310, and the user character and the virtual environment information are arranged on a central area of the touch sensitive display 310, wherein the edge area non-overlapping the central area.

In FIG. 3a the touch sensitive gesture input device 320 is arranged in lower edge area of the touch sensitive display 310 but it can alternatively be arranged in any edge area (left, right, upper) of the touch sensitive display 310.

The touch sensitive gesture input device 320 may be used also for touch sensitive display 310 when not needed. The user may activate the touch sensitive gesture input device 320 by touching the edge area of the display 310, for example, and in response to the user's touch, the touch sensitive gesture input device 320 becomes visible.

When arranging the touch sensitive gesture input device 320 in the edge area of the touch sensitive display 310 and providing the virtual environment information and user character information in the central area of the touch sensitive display 310, many advantages are gained. For example, the user sees all necessary virtual environment information better and also gets better controllability to user character actions when having improved touch sensitive gesture input device 320 no matter in which kind of position or size the user character is shown on display 310.

Figure 3B:
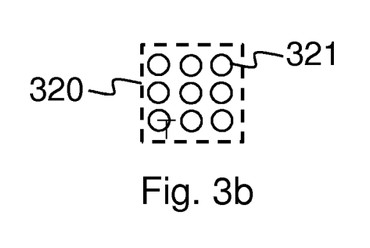

FIG. 3b presents an example schematic figure of the touch sensitive gesture input device 320 comprising a plurality of touch sensitive elements 321 arranged in a pre-defined array. The plurality of touch sensitive elements 321 are arranged in a pre-defined array comprising at least two rows of touch sensitive elements and at least two columns of touch sensitive elements. The total number of elements 321, the number of rows and columns may vary.

Figure 3C:
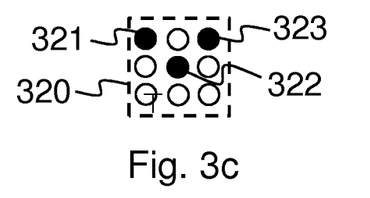
Figure 3D:
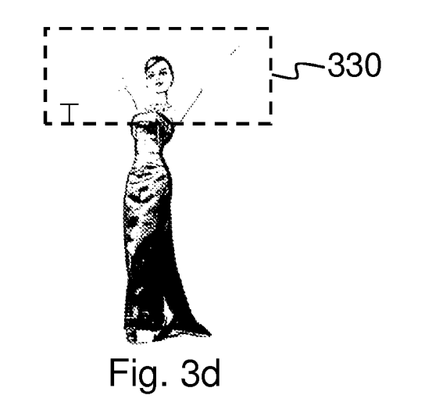

FIG. 3c presents an example schematic figure of the touch sensitive gesture input device 320 comprising a plurality of touch sensitive elements arranged in a pre-defined array. The example gesture illustrated in FIG. 3c comprises a continuous sweep comprising a first part defined by a continuous sweep from a first touch sensitive element 321 to a second touch sensitive element 322, and a second part defined by a continuous sweep from the second touch sensitive element 322 to a third touch sensitive element 323. As an example, the continuous multi-part sweep gesture using elements from 321 to 323 may be mapped to an action for the user character in the display 310 to raise both hands up as shown in FIG. 3d. The shape of the elements 321-323 illustrates such action and helps the user to remember mappings between sweep gestures and corresponding actions.

In an embodiment, reference gestures are maintained, wherein at least one reference gesture comprises a first reference part defined by a continuous sweep from a first touch sensitive element to a second touch sensitive element.

In an embodiment, when the user operates the touch sensitive gesture input device 320, a touch gesture is detected, the touch gesture comprising a first part defined by a continuous sweep from a first touch sensitive element 321 to a second touch sensitive element 322. The detected first part of the gesture is compared to first reference parts of the reference gestures and first feedback information is generated to the user in response to finding a matching first reference part based on comparison. The first feedback information to the user may be generated by changing color information of at least one touch sensitive element 321,322. For example, light green color may be used to indicate that based on the detected first part of the gesture there is a maintained reference gesture that comprises corresponding first gesture part. Alternatively, a line connecting the at least two touch sensitive elements may be drawn and colored accordingly to indicate the user of the gesture status. Alternatively, or in addition to the color information, sound information or tactile feedback information may be used.

In an embodiment, second feedback information is generated to the user in response to not finding a matching first reference part based on comparison. The second feedback may be different color information than the first feedback information, such as light red color to indicate that there is no reference gesture available that starts with the gesture sweep detected out so far. The sound and tactile feedback information may differ from first feedback sound and tactile feedback information, respectively.

FIG. 3*d* presents an example schematic figure of the action (raising both hands of the character) 330 generated by the multipart sweep gesture illustrated in FIG. 3*c*.

Reference gestures are maintained as multipart reference gestures, wherein at least one multipart reference gesture comprises a first reference part defined by a continuous sweep from a first touch sensitive element to a second touch sensitive element, and a second reference part defined by a continuous sweep from the second touch sensitive element to a third touch sensitive element.

If a user wants a character on the touch sensitive display 310 controlled by the user to carry out an action, the user triggers a sweep using the touch sensitive gesture input device 320. The touch gesture is detected as a multipart gesture, the multipart gesture comprises a first part defined by a continuous sweep from a first touch sensitive element to a second touch sensitive element, and a second part defined by a continuous sweep from the second touch sensitive element to a third touch sensitive element. The detected first part of the multipart gesture is then compared to first reference parts of the multipart reference gestures. By doing that, it can be determined which, if any, multipart reference gestures are available after the detected first part of the multipart gesture provided by the user. For example, if referring to FIG. 3*c*, the user has provided a sweep, for example by providing a continuous sweep using a finger, from element 321 to 322, it can be determined that at least one multipart reference gesture and corresponding action (raising both hands up) is available. At this point, when user's finger is still over the element 322 after providing the first part of the multipart sweep gesture, first feedback information may be generated to the user in response to finding a matching first reference part based on comparison of the first part of user provided sweep to reference parts maintained in the system.

Alternatively, the system may detect after comparing the detected first part of the multipart gesture to first reference parts of the multipart reference gestures that there is no reference multipart gesture available comprising the detected first part of the multipart gesture. Then, second feedback information to the user may be provided. Such second feedback may comprise, for example, indication that user has selected "wrong path" to start with and there are no reference gestures with such first part detected. In such situation the sensitive elements 321-322 so far touched will be colored in different color, for example red, as second feedback.

In an embodiment, there may at least two user levels, wherein the higher user level may have more reference multipart gestures than lower user level.

Figure 4:
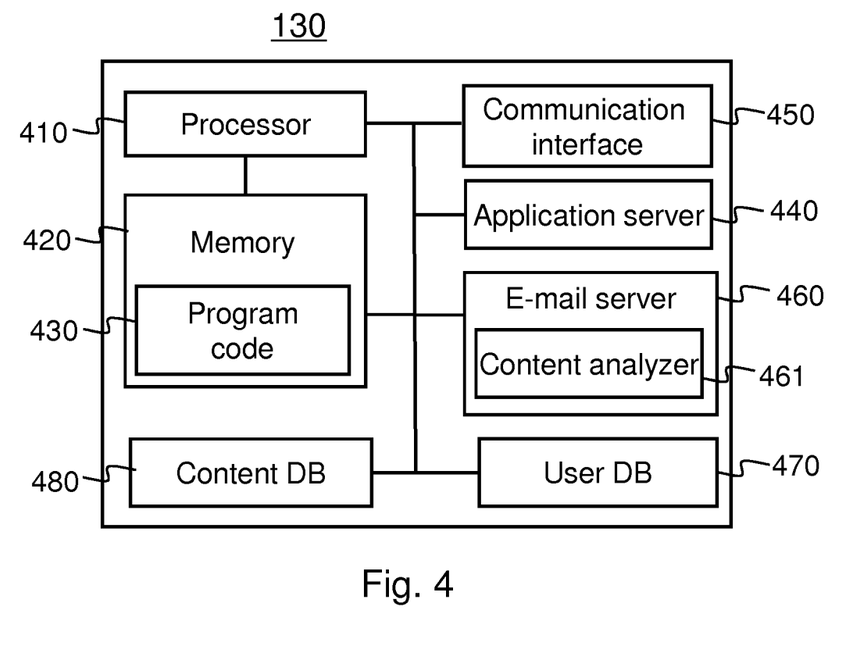
FIG. 4 presents an example block diagram of a server apparatus in which various embodiments of the present disclosure may be applied.

FIG. 4 presents an example block diagram of a server apparatus 130 in which various embodiments of the present disclosure may be applied.

The general structure of the server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 420 may be constructed as a part of the server apparatus 130 or it may be inserted into a slot, port, or the like of the server apparatus 130 by a user. The memory 420 may serve the sole purpose of storing data, or it may be constructed as a part of an apparatus serving other purposes, such as processing data.

The communication interface module 450 implements at least part of radio transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 450 may be integrated into the server apparatus 130, or into an adapter, card or the like that may be inserted into a suitable slot or port of the server apparatus 130. The communication interface module 450 may support one radio interface technology or a plurality of technologies. Captured activity data associated with environmental data of the user apparatus 120 may be received by the server apparatus 130 using the communication interface 450.

The e-mail server process 460, which receives e-mail messages sent from user apparatuses 120 and computer apparatuses 160 via the network 150. The server 460 may comprise a content analyzer module 461, which checks if the content of the received message meets the criteria that are set for new activity data item of the service. The content analyzer module 461 may for example check whether the e-mail message contains a valid data item to be used as virtual environment service data item. The valid service data item received by the e-mail server is then sent to an application server 440, which provides application services e.g. relating to the user accounts stored in a user database 470 and content of the content management service. Content provided by the service system 100 is stored in a content database 480.

A skilled person appreciates that in addition to the elements shown in FIG. 4, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 5:
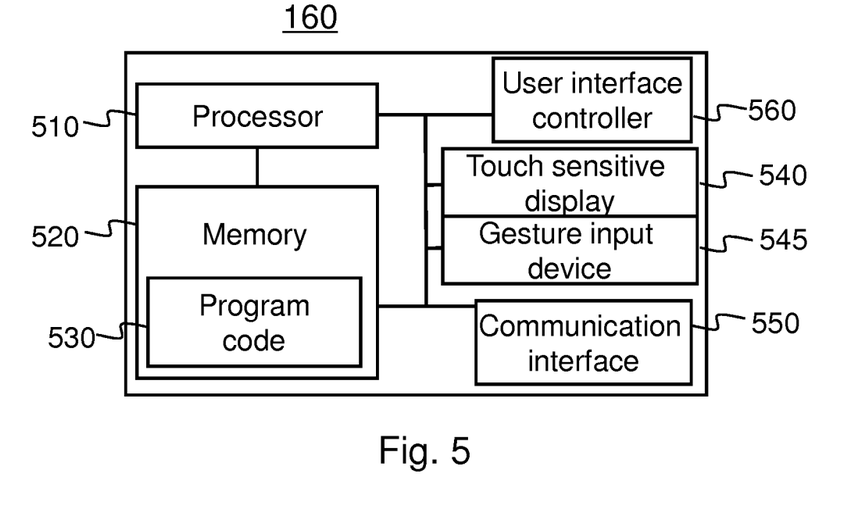
FIG. 5 presents an example block diagram of a computer apparatus in which various embodiments of the present disclosure may be applied.

FIG. 5 presents an example block diagram of a computer apparatus 110,160 in which various embodiments of the present disclosure may be applied. The computer apparatus 110,160 may be a user equipment (UE), user device or apparatus, such as a mobile terminal, a tablet, a smart phone, a laptop computer, or other communication device.

The general structure of the computer apparatus 110,160 comprises a user interface, such as a touch sensitive display 540, a touch sensitive gesture input device 545, a communication interface 550, a processor 510, and a memory 520 coupled to the processor 510. The computer apparatus 110,160 further comprises software 530 stored in the memory 520 and operable to be loaded into and executed in the processor 510. The software 530 may comprise one or more software modules and can be in the form of a computer program product. The computer apparatus 160 may further comprise a user interface controller 560. The touch sensitive gesture input device 545 may be integrated to the touch sensitive display 540 or provided as a separate device.

The processor 510 may be, e.g., a central processing unit (CPU), a microprocessor, a digital signal processor (DSP), a graphics processing unit, or the like. FIG. 5 shows one processor 510, but the computer apparatus 160 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The computer apparatus 160 may comprise a plurality of memories. The memory 520 may be constructed as a part of the computer apparatus 110, 160 or it may be inserted into a slot, port, or the like of the computer apparatus 110, 160 by a user. The memory 520 may serve the sole purpose of storing data, or it may be constructed as a part of an apparatus serving other purposes, such as processing data.

The user interface controller 560 may comprise circuitry for receiving input from a user of the computer apparatus 110, 160, e.g., via a keyboard, graphical user interface shown on the display of the user interfaces 240 of the computer apparatus 110, 160, speech recognition circuitry, or an accessory device, such as a headset, and for providing output to the user via, e.g., a graphical user interface or a loudspeaker.

The communication interface module 550 implements at least part of radio transmission. The communication interface module 550 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 550 may be integrated into the computer apparatus 110, 160, or into an adapter, card or the like that may be inserted into a suitable slot or port of the computer apparatus 110, 160. The communication interface module 550 may support one radio interface technology or a plurality of technologies. The computer apparatus 110, 160 may comprise a plurality of communication interface modules 550. Service data items may be downloaded from the server apparatus 130 and stored to the computer apparatus 110, 160.

A skilled person appreciates that in addition to the elements shown in FIG. 5, the computer apparatus 110, 160 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the computer apparatus 110, 160 may comprise a disposable or rechargeable battery (not shown) for powering when external power if external power supply is not available.

Figure 6:
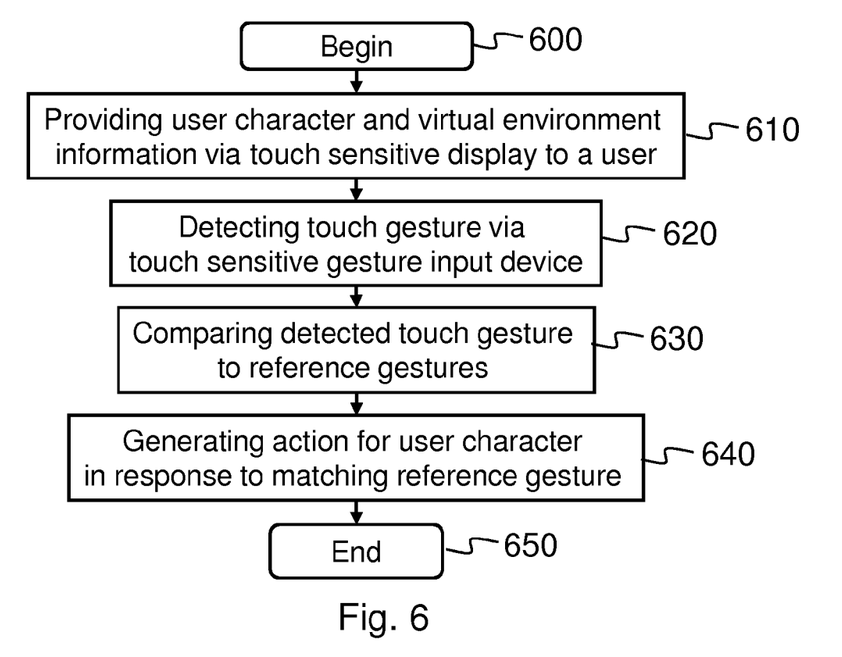
FIG. 6 shows a flow diagram showing operations in accordance with an example embodiment of the present disclosure.

FIG. 6 shows a flow diagram showing operations in accordance with an example embodiment of the present disclosure. In step 600, the method is started. In step 610, a user character and virtual environment information are provided via a touch sensitive display to a user. In step 620, a touch gesture is detected via a touch sensitive gesture input device, the touch gesture formed by a continuous sweep touching at least two touch sensitive elements arranged in the pre-defined array. In step 630, the detected touch gesture is compared to reference gestures of the user character for playing the game within the virtual environment. In step 640, an action is generated for the user character within the virtual environment in response to finding a matching reference gesture based on comparison. The method is ended in step 650.

Figure 7:
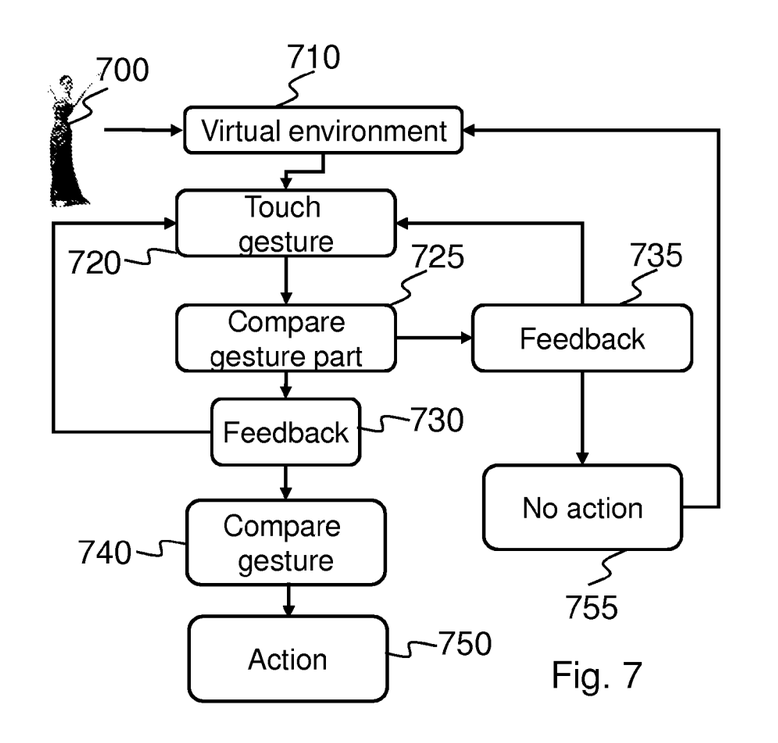
FIG. 7 shows a flow diagram showing gesture based character operation in accordance with an example embodiment of the present disclosure.

FIG. 7 shows a flow diagram showing gesture based character operation in accordance with an example embodiment. A user starts a game or a service using a user character 700 within the game or virtual environment service, for example. The user character and the virtual environment information 710 are provided to the user via the touch sensitive display. A touch gesture 720 is detected via a touch sensitive gesture input device, the touch gesture formed by a continuous sweep touching at least two touch sensitive elements arranged in the pre-defined array.

The touch gesture may be detected as a multipart gesture, the multipart gesture comprising a first part defined by a continuous sweep from a first touch sensitive element to a second touch sensitive element, and a second part defined by a continuous sweep from the second touch sensitive element to a third touch sensitive element.

The detected first part of the multipart gesture is compared 725 to first reference parts of the multipart reference gestures.

First feedback information 730 is provided to the user in response to finding a matching first reference part based on comparison. The first part of the multipart gesture compared 725 may comprise a sweep by user finger between first and second touch sensitive elements of a gesture input device. If any reference gesture comprises such first part of a multipart gesture then feedback information 730 is given to the user, for example by coloring the so far touched sensitive elements in certain color, such as in green. If the user releases finger from the touch sensitive gesture input device, the sweep gesture is regarded as ended and the whole gesture is compared 740 to reference gestures. If a reference gesture exists that corresponds to the sweep gesture just ended, an action 750 is generated for the character within the virtual environment in response to finding a matching reference gesture based on the comparison, wherein the action is mapped for the reference gesture. If the user does not release the finger (or any other pointing device, such as a stylus) after the feedback 730 but continues to provide a further part of a multipart sweep gesture, the system returns to detect a further gesture sweep part 720.

Second feedback information 735 is provided to the user in response to not finding a matching first reference part based on comparison 725. The first part of the multipart gesture compared 725 may comprise a sweep by user finger between first and second touch sensitive elements of a gesture input device. If none of the reference gesture comprises such first part of a multipart gesture then second feedback information 735 is given to the user, for example by coloring the so far touched sensitive elements in a different color, such as in red.

If the user releases finger from the touch sensitive gesture input device in step 735, the sweep gesture is regarded as ended and since there are no reference gestures available, no action 755 is provided for the character and the method returns to the virtual environment as is 710 and waiting for further user input 720.

If the user does not releases finger from the touch sensitive gesture input device in step 735, but returns within the ongoing and active sweep to the previous touch sensitive element, the sweep gesture is regarded as not ended and gesture continues to be detected 720, as if the latest part of the multipart gesture did not exist and waiting for further user input 720 for a further gesture part.

In an embodiment, a server computer or centralized authority may not be necessary. For example, the present present disclosure may, in an embodiment, be practiced on one or more devices without a central authority. In such an embodiment, any functions described herein as performed by the server computer or data described as stored on the server computer may instead be performed by or stored on one or more such devices.

In an embodiment, players may improve their progression in the virtual environment service and gain further and advanced actions and multipart gestures.

Figure 8A:
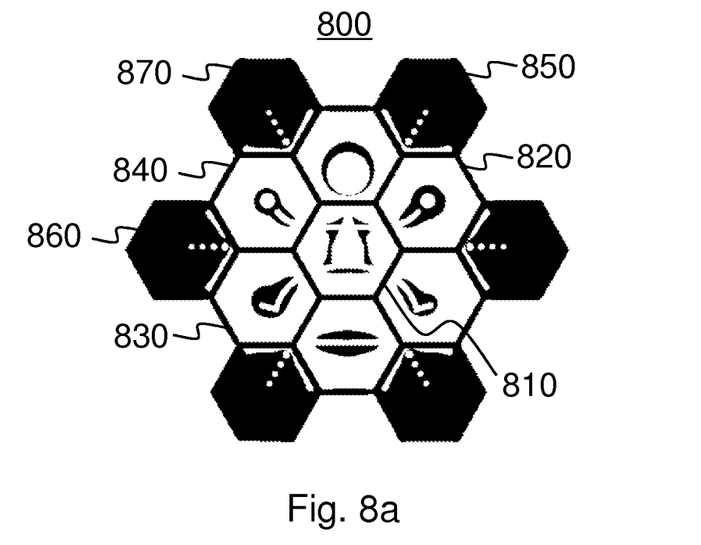
FIGS. 8a-b present example schematic figures of a user interface of an apparatus for controlling a character for playing a game within a virtual environment in which various embodiments of the present disclosure may be applied.
Figure 8B:
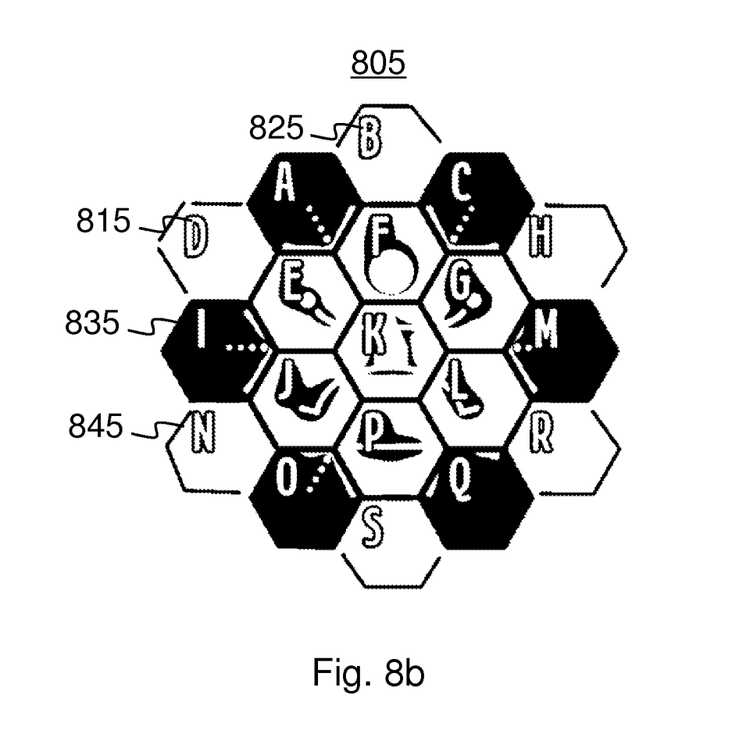

FIGS. 8*a-b* present example schematic figures of a user interface of an apparatus for controlling a character for playing a game within a virtual environment in which various embodiments of the present disclosure may be applied.

FIG. 8*a* presents an example schematic figure of the touch sensitive gesture input device 800 comprising a plurality of touch sensitive elements 810-870 arranged in a pre-defined array.

In an embodiment, first touch sensitive elements 810-840 are further configured to provide character information to assist user to input sweep gesture. Right hand of the user character may be raised or waved by starting a sweep gesture from the touch sensitive element 810 towards touch sensitive element 820, for example. Left leg of the user character may be raised or kicked by starting a sweep gesture from the touch sensitive element 810 towards touch sensitive element 830, for example.

In an embodiment, second touch sensitive elements 850-870 are further configured to provide gesture or gesture based action information to assist user to input sweep gesture. Right hand of the user character may be raised or waved by starting a sweep gesture from the touch sensitive element 810 and ending the sweep gesture to the touch sensitive element 850 via the touch sensitive element 820, for example. Left leg of the user character may be raised or kicked by starting a sweep gesture from the touch sensitive element 810 and ending the sweep gesture to the touch sensitive element 860 via the touch sensitive element 830, for example.

The example gesture illustrated in FIG. 8*a* comprises a continuous sweep comprising a first part defined by a continuous sweep from a first touch sensitive element 810 to a second touch sensitive element 820, and a second part defined by a continuous sweep from the second touch sensitive element 820 to a third touch sensitive element 850. As an example, the continuous multi-part sweep gesture using elements from 850 via elements 820, 810, 840 to 870 may be mapped to an action for the user character in the display to raise both hands up as shown in FIG. 3*d*. The shape of the elements 850 to 870 illustrates such action and makes helps the user to remember mappings between sweep gestures and corresponding actions.

FIG. 8*b* presents an example schematic figure of the touch sensitive gesture input device 805 comprising a plurality of touch sensitive elements arranged in a pre-defined array wherein each touch sensitive element is mapped with a code 815, 825, for example an alphabet (A-S) as illustrated in FIG. 8*b*.

In an embodiment, the codes 815, 825 are used to map an action for the character within the virtual environment in response to finding a matching reference gesture based on comparison of the detected touch gesture to reference gestures of the character for playing the game within the virtual environment.

In an embodiment, the codes 815, 825 may be provided on the touch sensitive gesture input device 805. The codes 815, 825 may be selected so that the combination of consecutive codes, based on the detected touch gesture via the touch sensitive gesture input device, wherein the touch gesture formed by a continuous sweep touching at least two touch sensitive elements arranged in the pre-defined array, form a word describing the action. Such codes may comprise, for example but not visible in FIG. 8*b*, a first code of "U" and a second code "P", resulting to word "UP" and corresponding action of moving something up.

In an embodiment, actions for the user character within the virtual environment are mapped in response to finding a matching reference gesture based on comparison of the detected touch gesture to reference gestures of the user character for playing the game within the virtual environment. The user character and the virtual environment information are provided via the touch sensitive display, a touch gesture detected via the touch sensitive gesture input device, and the touch gesture formed by a continuous sweep touching at least two touch sensitive elements arranged in the pre-defined array. The detected touch gesture is compared to reference gestures of the character for playing the game within the virtual environment, wherein the detected touch gesture may be coded using the concatenated touch sensitive element codes as illustrated in FIG. 8*b*. For example, if detecting a continuous sweep gesture starting from element 815 and ending at element 845 via element 835, codes D, I and N are detected and thus a code word DIN is created.

Then again, reference gestures are stored to the virtual environment game data in a server of the system, wherein the reference gestures may be represented by code words mapped with corresponding actions. Such clear and concise solution makes mapping of reference gestures and corresponding actions easier. An action is generated for the character within the virtual environment in response to finding a matching reference gesture based on comparison of the detected code word (continuous sweep gesture using a plurality of touch sensitive elements) and the maintained reference code words (reference gestures defined using a plurality of touch sensitive elements). For example, an action of "Fly Kiss" may be generated if the user inputs a gesture of code word E-F-A (sweeping elements E, F and A).

In an embodiment, following mapping table may be maintained for different actions and corresponding reference code words:

| Action: | Gesture code word: |
|---|---|
| "Wave" | "GC" |
| "Point" | "EI" |
| "ThaiGreeting" | "FK" |
| "Applause" | "EKG" |
| "Cry" | "EFG" |
| "Facepalm" | "GF" |
| "Bowing" | "FKP" |
| "Curtsey" | "KPQ" |
| "Dance" | "KJPL" |
| "HeadScratch" | "EF" |
| "Sleep" | "CFK" |
| "Fly Kiss" | "EFA" |
| "Jump" | "PKF" |
| "Gandam" | "KPLM" |

In an embodiment, reference gestures are maintained as multipart reference gestures, wherein at least one multipart reference gesture comprising a first reference part defined by a continuous sweep from a first touch sensitive element to a second touch sensitive element, and a second reference part defined by a continuous sweep from the second touch sensitive element to a third touch sensitive element. Furthermore, the touch gesture is detected as a multipart gesture, the multipart gesture comprising a first part defined by a continuous sweep from a first touch sensitive element to a second touch sensitive element, and a second part defined by a continuous sweep from the second touch sensitive element to a third touch sensitive element. Then, the detected first part of the multipart gesture is compared to first reference parts of the multipart reference gestures, and first feedback information may be generated to the user in response to finding a matching first reference part based on comparison. Second feedback information may be generated to the user in response to not finding a matching first reference part based on comparison. Thus, the user gets up-to-date information of the status of the active gesture input, and whether the sweep gesture in process is possible or not based on the touch sensitive elements touched so far.

In an embodiment, the first and the second feedback information may be indicated with different colors, for example. The first feedback information may be positive in a sense that the user is informed that the sweep gesture or part of it input so far is possible and mapping reference gesture may be available.

In an embodiment, if the user starts a sweep gesture from a touch sensitive element labeled with "E" in FIG. 8b and sweeps next to a touch sensitive element labeled with "K", reference sweep gestures starting "EK" may be checked on-the-fly. Then, it is detected that at least an action "Applause" with a code word "EKG" could be possible. Thus, first feedback information is provided to the user. The first feedback information may comprise, for example, changing color of both so far touched touch sensitive elements "E" and "K" as light green to indicate that an action mapping to gesture may be possible.

In an embodiment, if the user starts a sweep gesture from a touch sensitive element labeled with "E" in FIG. 8b and sweeps next to a touch sensitive element labeled with "K" followed by G", reference sweep gestures starting "EKG" may be checked on-the-fly. Then, it is detected that an action "Applause" with a code word "EKG" is available. Thus, first feedback information is provided to the user. The first feedback information may comprise, for example, changing color of all so far touched touch sensitive elements "E", "K" and "G" as dark green to indicate that an action mapping to gesture is available and ready to be generated. Once the user releases his touch from the touch sensitive gesture input device, the action is generated for the character within the virtual environment in response to finding a matching reference gesture based on comparison.

Then again, if the user starts a sweep gesture from a touch sensitive element labeled with "E" in FIG. 8b and sweeps next to a touch sensitive element labeled with "A", reference sweep gestures starting "EA" may be checked on-the-fly. Then, it is detected that no action with a code word starting with "EA" could be possible. Thus, second feedback information is provided to the user. The second feedback information may comprise, for example, changing color of both so far touched touch sensitive elements "E" and "A" as red to indicate that an action mapping to gesture is not possible.

In an embodiment, first and second feedback information may be given by providing lines between the touch sensitive elements touch so far and changing color of the lines accordingly, instead of changing color of the whole elements 815-845. In an embodiment, first and second feedback information may comprise at least one of the following: sound information and tactile feedback information.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the present disclosure are set out in the independent claims, other aspects of the present disclosure comprise other combinations of features from the described embodiments and/or the dependent claims with the features of the independent claims, and not solely the combinations explicitly set out in the claims.

The foregoing description has provided by way of non-limiting examples of particular implementations and embodiments of the present disclosure a full and informative description of the best mode presently contemplated by the inventors for carrying out the present disclosure. It is however clear to a person skilled in the art that the present disclosure is not restricted to details of the embodiments presented above, but that it can be implemented in other embodiments using equivalent means or in different combinations of embodiments without deviating from the characteristics of the present disclosure. Furthermore, some of the features of the above-disclosed embodiments of this present disclosure may be used to advantage without the corresponding use of other features. As such, the foregoing description shall be considered as merely illustrative of the principles of the present present disclosure, and not in limitation thereof. Hence, the scope of the present disclosure is only restricted by the appended patent claims.

The invention claimed is:

1. An apparatus for controlling a user character for playing a game within a virtual environment, comprising:
   a touch sensitive display for displaying a user character and virtual environment information to a user;
   a touch sensitive gesture input device comprising a plurality of touch sensitive elements arranged in a pre-defined array, wherein the touch sensitive gesture input device is integrated to the touch sensitive display;
   at least one processor; and
   at least one memory including computer program code, the at least one memory and the computer program code being configured to, with the at least one processor, cause the apparatus at least to:
   provide the user character and the virtual environment information via the touch sensitive display;
   maintain reference gestures as multipart reference gestures, wherein at least one multipart reference gesture comprising a first reference part defined by a continuous sweep from a first touch sensitive element to a second touch sensitive element, and a second reference part defined by the continuous sweep from the second touch sensitive element to a third touch sensitive element, wherein the first reference part and the second reference part define a continuous sweep comprising the first and the second reference part;
   detect a touch gesture as a multipart gesture via the touch sensitive gesture input device, the multipart gesture comprising a first part defined by a continuous sweep from a first touch sensitive element to a second touch sensitive element, and a second part defined by the continuous sweep from the second touch sensitive element to a third touch sensitive element, wherein the first part and the second part define a continuous sweep comprising the first and the second part;
   compare the detected first part of the multipart gesture to first reference parts of the multipart reference gestures of the user character for playing the game within the virtual environment;
   generate first feedback information to the user during the continuous sweep in response to finding a matching first reference part based on the comparison; and
   generate an action for the user character within the virtual environment in response to finding a matching reference gesture to the detected touch gesture.

2. The apparatus of claim 1, wherein the touch sensitive gesture input device is discrete from the touch sensitive display.

3. The apparatus of claim 1, wherein the plurality of touch sensitive elements are arranged in a pre-defined array comprising at least two rows of touch sensitive elements and at least two columns of touch sensitive elements.

4. The apparatus of claim 1, wherein the at least one memory and the computer program code being further configured to, with the at least one processor, cause the apparatus at least to:
   determine a code for each touch sensitive element; and
   provide the code on the touch sensitive gesture input device labeling the touch sensitive element associated with the code.

5. The apparatus of claim 4, wherein the at least one memory and the computer program code being further configured to, with the at least one processor, cause the apparatus at least to:
   generate an action for the character in response to finding a matching reference gesture using a plurality of codes based on comparison of the detected touch gesture of the plurality of codes to reference codes.

6. The apparatus of claim 5, wherein the at least one memory and the computer program code being further configured to, with the at least one processor, cause the apparatus at least to:
   determine each code to comprise an alphabet;
   maintain reference gesture with corresponding action represented by a code word comprising a plurality of alphabets; and
   detect the code word as a continuous sweep gesture using a plurality of touch sensitive elements.

7. The apparatus of claim 5, wherein the at least one memory and the computer program code being further configured to, with the at least one processor, cause the apparatus at least to:
   compare the detected first part of the multipart gesture to first reference parts of the multipart reference gestures; and
   generate second feedback information to the user in response to not finding a matching first reference part based on comparison.

8. A computer-implemented method for controlling a user character for playing a game within a virtual environment, comprising:
   providing a user character and virtual environment information via a touch sensitive display to a user;
   maintaining reference gestures as multipart reference gestures, wherein at least one multipart reference gesture comprising a first reference part defined by a continuous sweep from a first touch sensitive element to a second touch sensitive element, and a second reference part defined by the continuous sweep from the second touch sensitive element to a third touch sensitive element, wherein the first reference part and the second reference part define a continuous sweep comprising the first and the second reference part;
   detecting a touch gesture as a multipart gesture via the touch sensitive gesture input device, the multipart gesture comprising a first part defined by a continuous sweep from a first touch sensitive element to a second touch sensitive element, and a second part defined by the continuous sweep from the second touch sensitive element to a third touch sensitive element, wherein the first part and the second part define a continuous sweep comprising the first and the second part;
   comparing the detected first part of the multipart gesture to first reference parts of the multipart reference gestures of the user character for playing the game within the virtual environment;
   generating first feedback information to the user during the continuous sweep in response to finding a matching first reference part based on the comparison; and
   generating an action for the user character within the virtual environment in response to finding a matching reference gesture to the detected touch gesture.

9. The method of claim 8, further comprising:
   generating first feedback information to the user by changing color information of at least one touch sensitive element.

10. The method of claim 8, further comprising:
    comparing the detected first part of the gesture to first reference parts of the multipart reference gestures; and
    generating second feedback information to the user in response to not finding a matching first reference part based on comparison.

11. The method of claim 10, further comprising:
generating second feedback information to the user by changing color information of at least one touch sensitive element.

12. The method of claim 8, wherein the first feedback information to the user comprising at least one of the following:
- changed color information of at least one touch sensitive element;
- changed color information of a line provided for connecting at least two touch sensitive elements;
- sound information; and
- tactile feedback information.

13. The method of claim 11, wherein the second feedback information to the user comprising at least one of the following:
- changed color information of at least one touch sensitive element;
- changed color information of a line provided for connecting at least two touch sensitive elements;
- sound information; and
- tactile feedback information.

14. The method of claim 8, further comprising:
receiving reference gesture information from a user, the reference gesture information comprising a reference gesture of the user character for playing the game within the virtual environment, and action information defining an action for the user character within the virtual environment corresponding to the reference gesture information;
approving the received reference gesture information by an administrator of the virtual environment; and
maintaining the received reference gesture and corresponding action to be used by at least one user for playing the game within the virtual environment in response to approving.

15. A computer program embodied on a computer readable non-transitory medium comprising computer executable program code, which code, when executed by at least one processor of an apparatus, causes the apparatus to:
provide a user character and virtual environment information via the touch sensitive display to a user;
maintain reference gestures as multipart reference gestures, wherein at least one multipart reference gesture comprising a first reference part defined by a continuous sweep from a first touch sensitive element to a second touch sensitive element, and a second reference part defined by the continuous sweep from the second touch sensitive element to a third touch sensitive element, wherein the first reference part and the second reference part define a continuous sweep comprising the first and the second reference part;
detect a touch gesture as a multipart gesture via the touch sensitive gesture input device, the multipart gesture comprising a first part defined by a continuous sweep from a first touch sensitive element to a second touch sensitive element, and a second part defined by the continuous sweep from the second touch sensitive element to a third touch sensitive element, wherein the first part and the second part define a continuous sweep comprising the first and the second part
compare the detected first part of the multipart gesture to first reference parts of the multipart reference gestures of the user character for playing the game within the virtual environment;
generate first feedback information to the user during the continuous sweep in response to finding a matching first reference part based on the comparison; and
generate an action for the user character within the virtual environment in response to finding a matching reference gesture to the detected touch gesture.

* * * * *